US012187035B2

(12) United States Patent
Horiguchi

(10) Patent No.: US 12,187,035 B2
(45) Date of Patent: Jan. 7, 2025

(54) INKJET PRINTER

(71) Applicant: KISHU GIKEN KOGYO CO., LTD., Wakayama (JP)

(72) Inventor: Ryusuke Horiguchi, Wakayama (JP)

(73) Assignee: KISHU GIKEN KOGYO CO., LTD., Wakayama (JP)

( * ) Notice: Subject to any disclaimer, the term of this patent is extended or adjusted under 35 U.S.C. 154(b) by 182 days.

(21) Appl. No.: 18/153,695

(22) Filed: Jan. 12, 2023

(65) Prior Publication Data

US 2024/0239101 A1 Jul. 18, 2024

(51) Int. Cl.

*B41J 2/025* (2006.01)
*B41J 2/02* (2006.01)
*B41J 2/085* (2006.01)
*B41J 2/09* (2006.01)
*B41J 2/165* (2006.01)
*B41J 2/185* (2006.01)
*B41J 2/21* (2006.01)
*B41J 2/17* (2006.01)

(52) U.S. Cl.

CPC . *B41J 2/09* (2013.01); *B41J 2/02* (2013.01); *B41J 2/085* (2013.01); *B41J 2/16526* (2013.01); *B41J 2/16552* (2013.01); *B41J 2/185* (2013.01); *B41J 2/2132* (2013.01); *B41J 2002/16555* (2013.01); *B41J 2/1714* (2013.01); *B41J 2002/1853* (2013.01)

(58) Field of Classification Search

CPC ... B41J 2/09; B41J 2/02; B41J 2/16526; B41J 2/16552; B41J 2/1714; B41J 2002/16555

See application file for complete search history.

(56) References Cited

U.S. PATENT DOCUMENTS

| | | | | |
|---|---|---|---|---|
| 9,248,646 | B1 * | 2/2016 | Egan | B41J 2/105 |
| 10,052,868 | B1 * | 8/2018 | Tunmore | B41J 25/001 |
| 2011/0285786 | A1 * | 11/2011 | Sekiya | B41J 2/185 347/34 |

FOREIGN PATENT DOCUMENTS

| | | | | |
|---|---|---|---|---|
| CN | 105313455 A * | 2/2016 | B41J 11/06 |
| JP | 2002210981 A * | 7/2002 | B41J 2/03 |
| JP | 2003025592 A * | 1/2003 | B41J 2/16552 |
| JP | 2007253613 | 10/2007 | |
| JP | 2014100876 A | 6/2014 | |
| JP | 2018083369 A | 5/2018 | |
| JP | 2022125484 | 8/2022 | |
| WO | WO2010/096520 | 8/2010 | |
| WO | WO2010/098042 | 9/2010 | |

* cited by examiner

*Primary Examiner* — Julian D Huffman

(74) *Attorney, Agent, or Firm* — Leonid Kisselev

(57) ABSTRACT

In an inkjet printer of the present invention, an air blowing outlet is formed around a slit through which ink droplets pass in a cap of a head cover, and air is blown toward a printing object from the blowing outlet. The air blowing outlet is formed independent of the slit, and the direction in which the air is blown is substantially parallel to the flight direction of ink droplets, and thus hardly any blown air meets the ink droplets that have passed through the slit and are flying toward the printing object. On the other hand, ink particles that have rebounded off the printing object are repelled by the air blown from the blowing outlet, and thus the amount of ink particles entering the head cover via the slit is suppressed.

12 Claims, 6 Drawing Sheets

INKJET PRINTER

STATEMENT REGARDING PRIOR DISCLOSURE BY INVENTOR

The disclosure of Japanese Patent Application serial No. 2021-163210, filed on Oct. 4, 2021, including the specification, drawings and abstract is incorporated herein by reference. The Japanese Patent Application serial No. 2021-163210 was published on Jan. 14, 2022, and is not prior art to the present application under 35 U.S.C. 102(b)(1)(a).

FIELD

The present invention relates to a continuous inkjet printer, and more specifically to preventing dirtying of a printhead caused by ink rebounding off a printing surface.

BACKGROUND

Continuous inkjet printers have a configuration in which ink is ejected from a nozzle by a pump, ink droplets are electrically charged by a charging electrode at a position at which the ejected ink separates into such ink droplets, and furthermore the path of the ink droplets is deflected by deflection electrodes so that the ink droplets collide with a printing object at predetermined positions thereon to form ink dots.

In continuous inkjet printers, due to the nature of ejecting ink to print, constituent members of a printhead become dirtied with ink, and thus measures are taken according to the cause of the dirtying.

The first cause of dirtying is ink mist generated by ejected ink, and, in order to mitigate dirtying caused by ink mist, a printhead is covered with a head cover and positive pressure is maintained inside the cover (see JP 2018-83369A).

Specifically, a pressurizing means is used to maintain positive pressure inside the head cover such that ink mist floating around the constituent members of the printhead is discharged through an ink droplet passage slit. Thus, ink mist is kept from attaching to the constituent members and as incidental effects, foreign matter such as dust is prevented from entering the cover from the outside, and the formation of condensation inside the cover is also prevented.

The second cause of dirtying is minute ink particles formed due to ink droplets rebounding upon collision with a printing object.

Ink droplets flying from the printhead have kinetic energy and break apart under this kinetic energy upon collision with a printing object, and the thus ruptured ink particles rebound off and scatter around the printing surface. Some minute scattered ink particles enter the cover through a slit in the leading end of the head cover.

Ink particles that have entered the head cover via the slit attach to the surfaces of deflection electrodes and the like that constitute the printhead, and accumulate into solids. Also, conductive ink is used in continuous inkjet printers, and the main body of the head cover is made of metal. Accordingly, if ink is left to accumulate, in addition to the surfaces of electrodes and the like becoming dirty, the accumulated ink and the metal constituent members of the head included in the cover short-circuit, thus causing a malfunction.

In particular, a high DC voltage is applied to the deflection electrodes in order to deflect ink droplets, and thus leaving ink to accumulate may lead to a major incident.

Increasing the positive pressure in the cover to increase the flow amount of air blown out from the slit is conceivable as a method for preventing ink particles from entering through the slit, but changes in the flight direction of the ink droplets caused by the air leads to reduced printing quality, and thus the pressure cannot be simply raised.

As another method for preventing ink particles from entering through the slit, blowing air in a direction intersecting the flight direction of the ink droplets has been proposed (see JP 2014-100876A).

However, in the method disclosed in Patent Document 2, similarly to the method of increasing the pressure in the cover, when the blown air is strong, the flight direction of the ink droplets is deflected and the printing quality is reduced. Thus, there is a limit to the strength at which the air can be blown, and the entry of ink particles through the slit cannot be sufficiently suppressed.

Furthermore, blown ink particles attach to and dirty the surface of a conveyer for transferring printing objects, and thus a new issue arises where the conveyer needs to be cleaned each time printing is performed.

SUMMARY

The present invention was made in view of the aforementioned conventional problems, and it is an object thereof to provide an inkjet printer that keeps dirtying of constituent members of the printhead and a transfer conveyer to a minimum without affecting printing quality.

In order to achieve the above-described object, the inkjet printer according to the present invention includes: a printhead including: a gun configured to generate continuous ink droplets by applying vibration having a constant period to ejected ink; a charging electrode configured to electrically charge the ink droplets by applying a stepped-wave voltage to the ink droplets in synchronization with the period of the ink droplets; a deflection electrode configured to deflect the electrically charged ink droplets in a vertical direction or a horizontal direction according to the amount of charge, and cause the ink droplets to land on a printing surface of a printing object; and a tubular head cover that houses the gun, the charging electrode, and the deflection electrode in a cavity portion, and that is provided with a slit through which the electrically charged ink droplets pass, the inkjet printer forming a character using rows of printed dots by causing the ink droplets ejected from the printhead to land on the printing object moving in the horizontal direction or the vertical direction, wherein the head cover is constituted by a tubular cover body having a rear end portion that is sealed, and a cap that is attached so as to cover a front portion of the cover body, the cap is provided with the slit and a blowing outlet that surrounds at least a portion of the slit, and air is blown out from the blowing outlet toward the printing object.

In the inkjet printer according to the present invention, the air blowing outlet is provided so as to surround at least a portion of the slit in the head cover, air is blown from the blowing outlet toward the printing object, and the entry of minute ink particles, which have rebounded off a printing object, into the cover via the slit is kept to a minimum.

Also, the air blowing outlet is formed independent of the slit, and the direction in which air is blown is substantially parallel to the flight direction of ink droplets, and thus the printing quality is unaffected.

Furthermore, minute ink particles that have been stopped from scattering by the blown air disperse in air, and the amount of ink that attaches to the surface of a transfer conveyer is largely reduced, and thus the number of times the conveyer needs to be cleaned can be reduced.

These and other objects, features and advantages of the present invention will become more apparent upon reading of the following detailed description along with the accompanied drawings.

BRIEF DESCRIPTION OF THE DRAWINGS

FIG. 3B is a block diagram showing, by way of example, a layer expansion template for grasslands.

DETAILED DESCRIPTION

Hereinafter, an inkjet printer according to an embodiment of the present invention will be described with reference to the drawings.

Embodiment 1

Figure 1:
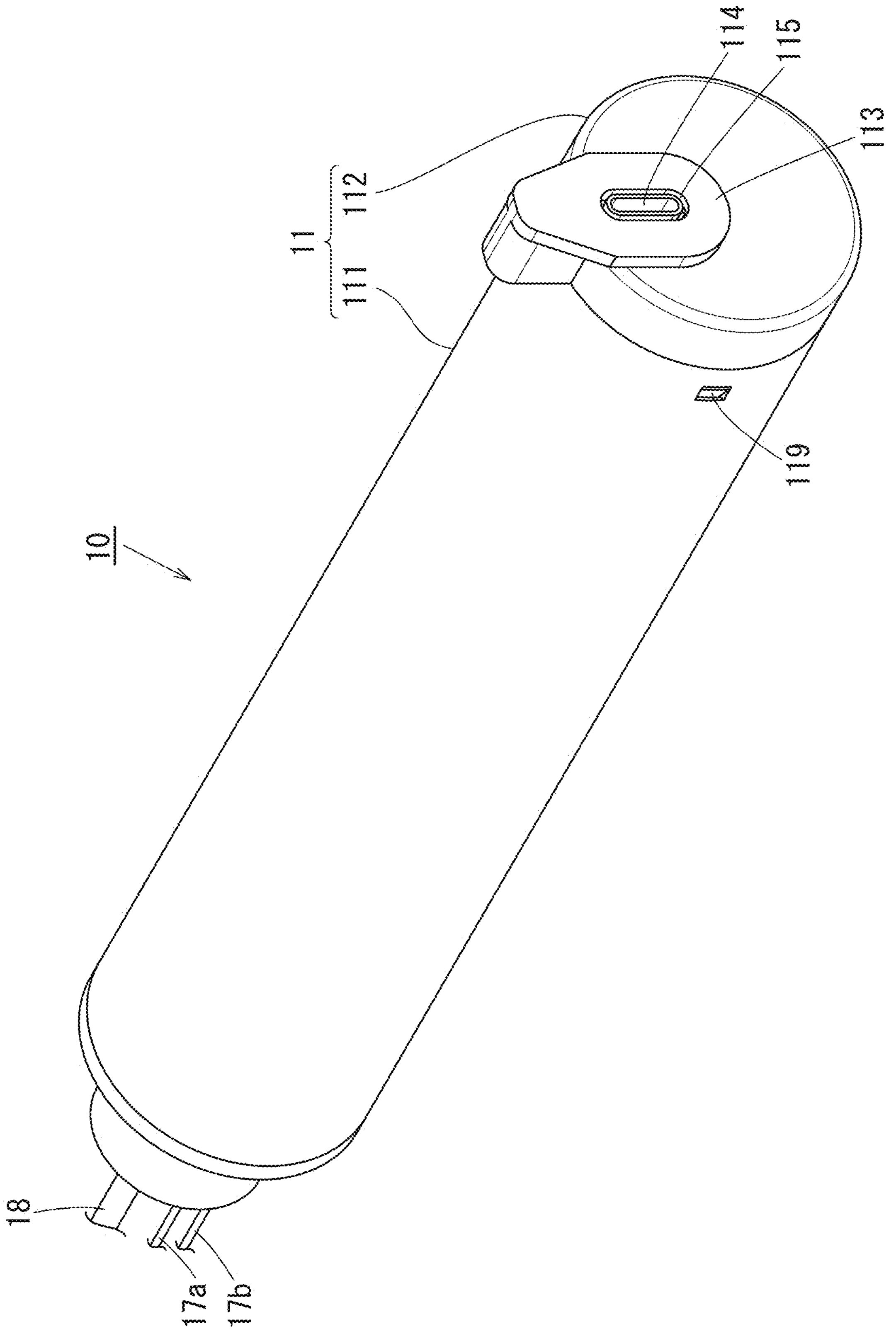
FIG. 1 is a perspective view showing the external appearance of a printhead according to Embodiment 1 of the present invention.
Figure 2:
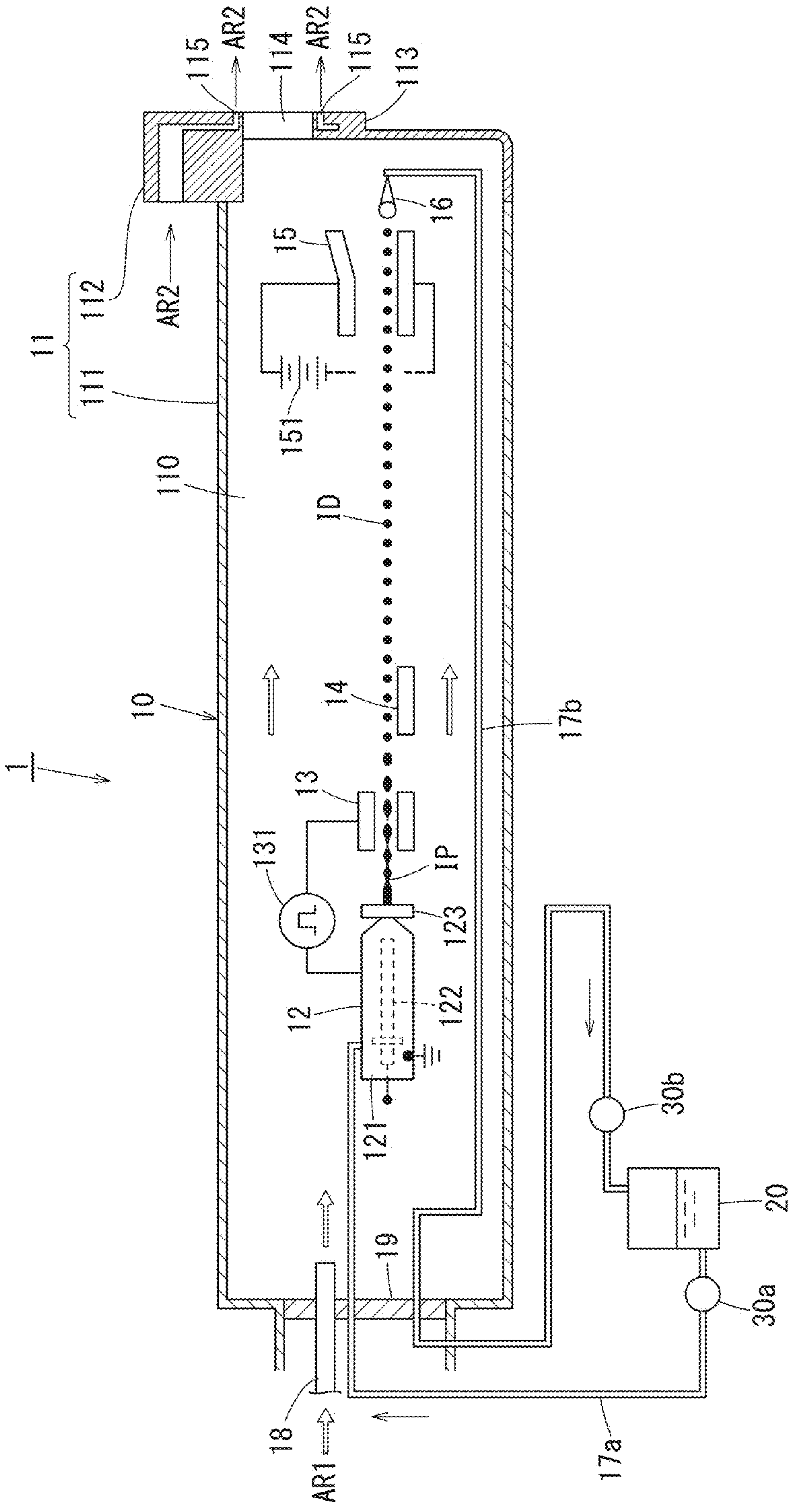
FIG. 2 is a partial cross-sectional front view showing the overall configuration of a continuous inkjet printer according to Embodiment 1 of the present invention that includes the printhead in FIG. 1.
Figure 3:
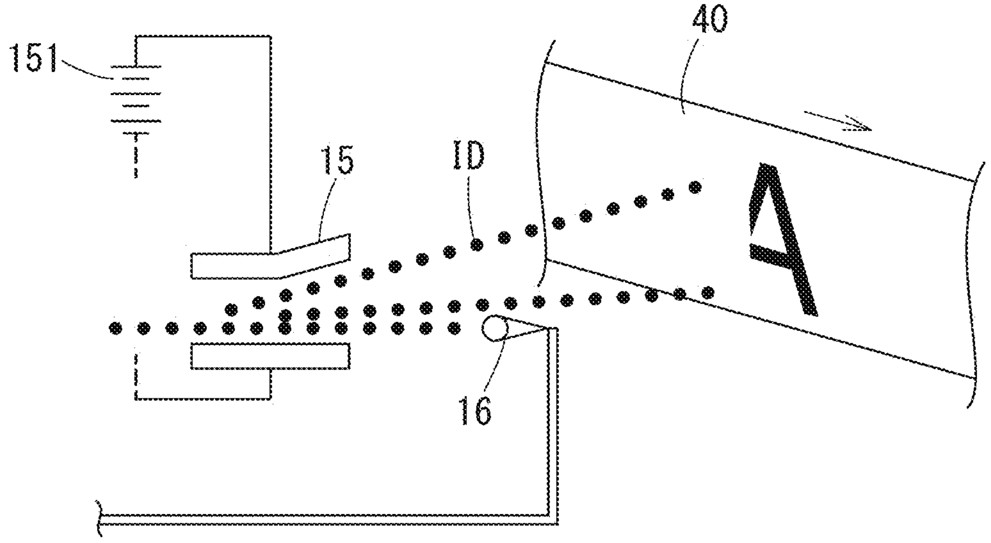
FIG. 3 is a diagram for illustrating operations performed when printing on a printing object using the inkjet printer shown in FIG. 2.

FIG. 1 is a perspective view showing the external appearance of a printhead 10 provided with functions for preventing dirtying thereof by ink that has rebounded off a printing surface, and FIG. 2 is a partial cross-sectional front view showing the overall configuration of a continuous inkjet printer (hereinafter simply referred to as a "printer") 1 according to the present embodiment that includes the printhead 10. Also, FIG. 3 is a diagram for illustrating operations performed when printing on a printing object using the printer 1 shown in FIG. 2.

The constituent members of the printer 10 according to the present embodiment are largely classified into members related to supplying ink to the printhead 10 and performing printing (hereinafter, these constituent members are referred to as an "ink supply system"), and members related to supplying air for pressurization and dirt prevention to the printhead 10 (hereinafter, these constituent members are referred to as an "air supply system"). First, the ink supply system constituent members will be described.

Ink Supply System

As shown in FIG. 2, the printer 1 is constituted by the printhead 10, an ink tank 20, and pumps 30*a* and 30*b*. The printhead 10 is constituted by a gun 12, charging electrodes 13, a detection electrode 14, deflection electrodes 15, a gutter 16, and pipes 17*a* and 17*b*, and these members are housed in a cylindrical head cover 11.

Members such as the gun 12 constituting the printhead 10 are actually disposed close together in a cavity portion 110 of the head cover 11, but FIG. 2 shows an overall arrangement so as to facilitate comprehension of the configuration and function of each member.

The gun 12 is configured to eject ink droplets ID toward a side surface of a printing object such as a decorative box 40 containing a product (see FIG. 3), and is constituted by a gun body 121, an ultrasonic transducer 122, and a nozzle 123. Ink pumped out from the ink tank 20 by the pump 30*a* and supplied to the gun body 121 through the pipe 17*a* is ejected from a hole in the nozzle 123 while vibration is applied by the ultrasonic transducer 122.

The column of ink IP ejected from the hole of the nozzle 123 separates into ink droplets ID due to the vibration applied by the ultrasonic transducer 122, and the ink droplets ID are further electrically charged by the charging electrodes 13, and then only the ink droplets ID that are needed for printing are deflected by the deflection electrodes 15 according to their amount of charge, and pass through a slit 114 formed in the front portion of the head cover 11 to land on the printing surface of the printing object.

FIG. 3 shows a decorative box (printing object) 40 that is moving on a belt conveyor (not shown) at a constant speed in the direction indicated by the arrow. Note that, in consideration of making the FIG. 3 easier to understand, the head cover 11 of the print head 10 is omitted as it is not related to printing operations.

The decorative box 40 is a box whose surface is coated with a polyethylene or polypropylene film, and, after a food item or the like has been packed therein, takes shape as a final product when a production number, an expiration date, or the like is printed on the film.

When, as shown in FIG. 3, the decorative box 40 moves in a direction orthogonal to a flight direction of the ink droplets ID, by changing the amount of deflection of the ink droplets ID so as to change the position at which the ink droplets ID land on a side surface of the decorative box 40, and repeating the deflection of the ink droplets ID in synchronization with the movement of the decorative box 40, a character ("A" in the drawing) is printed on the printing surface.

On the other hand, ink droplets ID that have not been electrically charged, and ink droplets ID that have been electrically charged but are not to be used for printing are not deflected, and fly into the gutter 16 for ink recovery so as to be collected in the ink tank 20. The ink collected in the gutter 16 is transferred to the ink tank 20 through the pipe 17*b* by the pump 30*b*, and is reused.

The operations of the printer 10 are controlled by a controller (not shown). The controller is constituted by a CPU, a memory (ROM, RAM, etc.), a timer, and a display, and controls the operations of the ultrasonic transducer 122 of the gun 12, a pulsation power supply 131 of the charging electrodes 13, the detection electrode 14, a DC power supply 151 of the deflection electrodes 15, and the pumps 30*a* and 30*b*.

Specifically, the controller drives the pump 30*a* to apply pressure to the ink stored in the ink tank 20 and supply the pressurized ink to the gun body 121. Also, the controller controls the timing at which a pulse voltage is applied to the charging electrodes 13 from the pulsation power supply 131, based on a signal detected by the detection electrode 14, so as to adjust the number of ink droplets ID to be electrically charged and the timing at which they are electrically charged. Furthermore, the controller controls the voltage of the DC power supply 151 so as to adjust the deflection amount of ink droplets ID to be deflected by the deflection electrodes 15.

Air Supply System.

Figure 4:
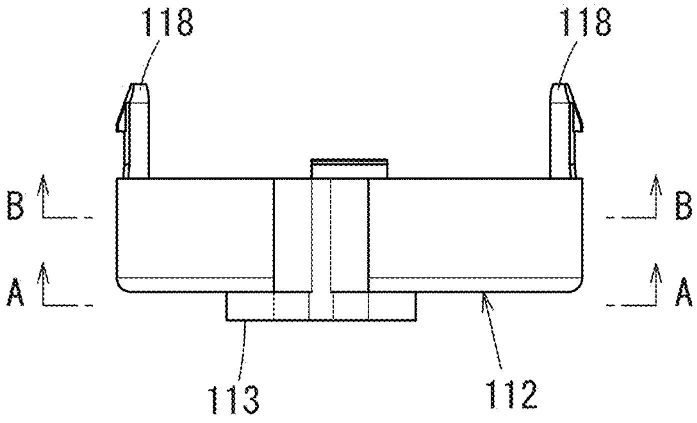
FIG. 4 is a plan view of a cap that is provided with a slit through which ink droplets pass, in a head cover.
Figure 5A:
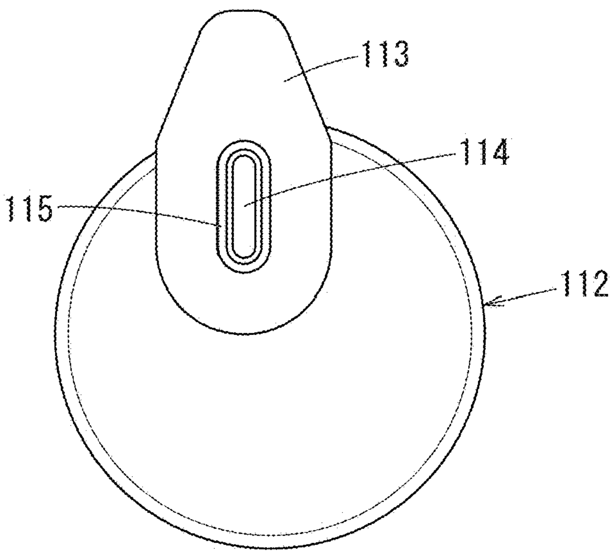
FIG. 5A is a front view of the cap.
Figure 5B:
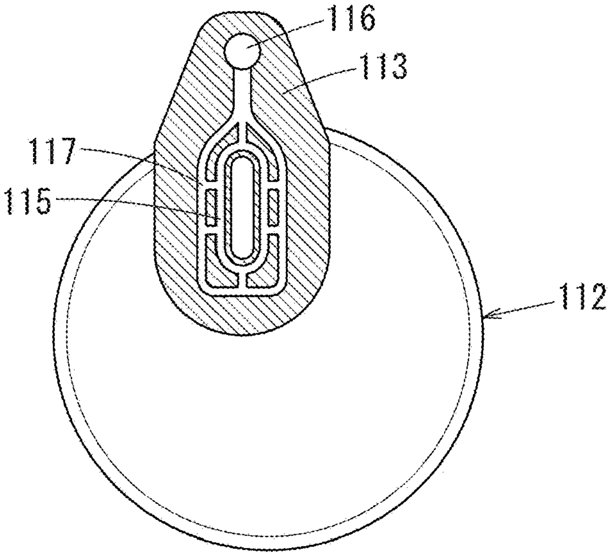
FIG. 5B is a cross-sectional view of the cap.
Figure 5C:
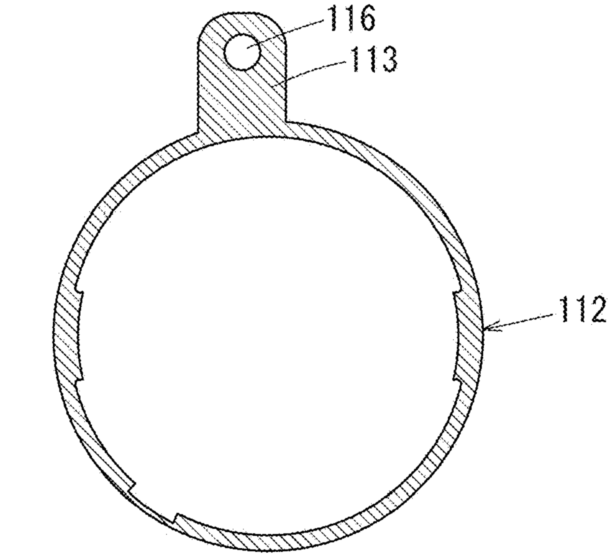
FIG. 5C is a cross-sectional view of the cap.

Next, the air supply system of the printer 10 will be described with reference to the aforementioned FIGS. 1 and 2 as well as FIGS. 4 and 5. FIG. 4 is a plan view of a cap 112 that is provided with the slit 114 through which ink droplets pass in the head cover 11. FIG. 5A is a front view of the cap 112, FIG. 5B is a cross-sectional view of the cap 112 taken along line A-A in FIGS. 4, and 5C is a cross-sectional view of the cap 112 taken along line B-B in FIG. 4.

In the present invention, two functions are realized using air compressed by a compressor. Specifically, continuous printers realize the standard equipped functions of maintaining positive pressure in the head cover, and blowing air against ink particles that have rebounded off a printing surface to prevent ink particles from passing through a slit and entering the head cover.

Though not shown, first, a drain catch is used to remove excess moisture from air supplied from the compressor and through tubes, and oil mist is further removed by a mist separator.

Then, the air is split into two streams, namely, air AR1 that has passed through a first tube is supplied to the cavity portion 110 of the head cover 11, and air AR2 that branches into the second tube is supplied to an air blowing outlet 115 provided in the cap 112.

The functions of both air AR1 and AR2 will be described along with the configuration of the head cover 11. As shown in FIG. 2, the head cover 11 is constituted by a cylindrical cover body 111 and the cap 112 that is detachably attached to the front portion of the cover body 111.

The cover body 111 is made of metal in order to increase resistance to external noise, while the cap 112 is made of a resin in consideration of ease of molding.

First, the function of the first air AR1 will be described. A regulator (not shown) is attached at an intermediate position of first tube mentioned above to reduce the pressure of air compressed by the compressor to a suitable value, and the air AR1 whose pressure has been adjusted by the regulator is supplied to the head cover 11.

As shown in FIG. 2, a lid 19 that seals off the rear end portion of the cover body 111 of the head cover 11 is provided with a hole through which a tube 18 is passed, and the leading end of the tube 18 is open in the cavity portion 110 of the head cover 11. Excluding a vertically elongated slit 114 that acts as the opening portion through which ink droplets ID are ejected, the cavity portion 110 is sealed off, and most of the air AR1 (shown with a white arrow) supplied through the tube 18 remains in the head cover 11 and increases the air pressure.

In continuous printers, a portion of the ink ejected from the nozzle 123 floats as ink mist in the surrounding atmosphere, and attaches to and dirties the surfaces of the constituent members where it causes malfunctions, and thus members in the head cover 11 need to be cleaned regularly. Also, dust passes through the gutter and enters the ink circulation system where it causes malfunctions by clogging pipes and the like.

Thus, by housing the main members of the printhead 10 in the head cover 11, and maintaining positive pressure inside the head cover 11, the discharging of ink mist to the outside is promoted, and dust from the outside is prevented from entering the head cover 11. With such measures, the cycle at which the constituent members are to be cleaned can be delayed, and clogging of pipes and the like by dust can be avoided.

Next, the function of the second air AR2 that passes through the second tube and is supplied to the cap 112 of the head cover 11 will be described. The upper portion of a bottomed cylindrical cap 112 is provided with a thick portion 113, and the thick portion 113 is provided with the slit 114 through which ink droplets are ejected, and the blowing outlet 115 for blowing the air AR2 toward the printing object.

As shown in FIG. 5A, the blowing outlet 115 for the second air AR2 is formed so as to surround the slit 114. As shown in FIGS. 5B and 5C, a port 116 for connecting a tube (not shown) for air supplied from a compressor, and a channel 117 that links the port 116 and the blowing outlet 115 are provided inside the thick portion 113.

As shown in FIG. 5B, the channel 117 extending from the port 116 is formed so as to surround the blowing outlet 115 in order to make the strength at which the air AR2 is blown out from the blowing outlet 115 uniform, and so as to not affect the flight of ink droplets passing through the slit 114.

Note that, as shown in FIG. 4, a pair of locking pieces 118 are formed at positions opposing the rear end of the cylindrical portion of the cap 112, while, as shown in FIG. 1, a pair of locking holes 119 are formed at positions opposing the front portion of the cover body 111.

When attaching the cap 112 to the cover body 111, the locking pieces 118 of the cap 112 are inserted into the front portion of the cover body 111, and then the locking pieces 118 are engaged with the locking holes 119, thus integrating the cover body 111 and the cap 112 into one piece.

As shown with solid arrows in FIG. 2, in the present embodiment, the air blowing outlet 115 is formed around the slit 114 through which ink droplets pass, in the cap 112 of the head cover 11, and the air AR2 is blown toward the printing object from the blowing outlet 115.

The blowing outlet 115 for the air AR2 is formed independent of the slit 114, and the direction in which the air AR2 is blown is substantially parallel to the flight direction of the ink droplets ID, and thus hardly any blown air meets the ink droplets ID that have passed through the slit and are flying toward the printing object. Accordingly, the flight path of the ink droplets ID is not deflected by the air AR2 and the printing quality is not degraded.

On the other hand, ink particles that have rebounded off the printing object are repelled by the air AR2 blown from the blowing outlet 115, and thus the amount of ink particles entering the head cover 11 via the slit 114 is suppressed.

As a result, dirtying of the constituent members of the printhead 10 by ink can be kept to a minimum. Furthermore, it is possible to avoid a situation where ink solids accumulate on the surfaces of electrodes and the like, and a short circuit occurs between the accumulated ink and the metal constituent members of the head that includes the cover, thus causing a malfunction in the printer.

Also, as a supplementary effect of the air AR2, drying of ink is promoted by blowing air onto the ink that has landed on the printing surface, and smudging and transfer of the ink can be prevented.

Note that, if the pressure of the air AR2 blown out from the blowing outlet 115 is excessively high, the excessive pressure affects the flight of ink droplets passing through the slit 114 and degrades the printing quality. Conversely, if the pressure of the air AR2 is low, more ink particles enter the head cover 11. Accordingly, the pressure of the air AR2 needs to be set through experimentation so as to not affect the flight of ink droplets and so as to be able to keep ink particles from entering the head cover 11.

FIG. 6 are photos showing a printhead from which the head cover has been removed after repeated printing using a continuous printer, and are photos taken from in front of the vertically arranged deflection electrodes 15 in the printhead 10.

Figure 6A:
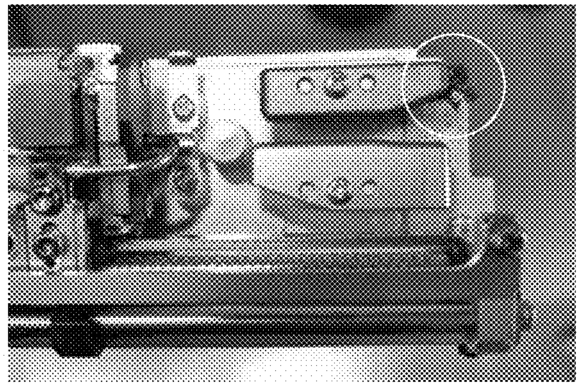
FIG. 6A is a photo showing a printhead with a head cover removed, FIG. 6A being a photo of a conventional printhead.
Figure 6B:
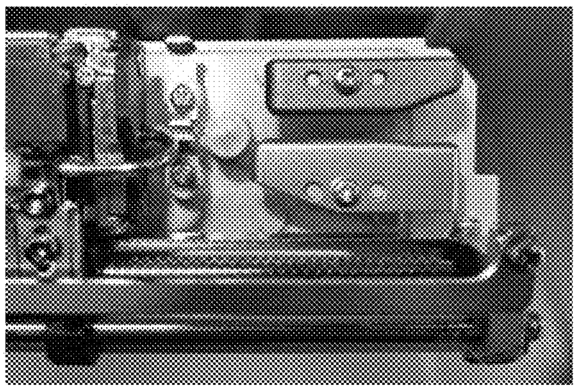
FIG. 6B is a photo showing a printhead with a head cover removed, FIG. 6B being a photo of a printhead according to Embodiment 1.

FIG. 6A is a photo showing a conventional printhead that does not include an air blowing outlet, and FIG. 6B is a photo showing the printhead according to the present invention that is provided with an air blowing outlet.

In experiments, a cap provided with a slit with a center distance of 9 mm and a width of 2.6 mm was used in a conventional printhead. Also, a cap in which a blowing outlet with a width of 1 mm surrounded the aforementioned slit was used in the printhead according to the present invention. Also, the air AR1 was supplied to the conventional printhead, and air AR1 and AR2 were supplied to the printhead according to the present invention, and the pressure of the air was adjusted so that a slight amount of air was blown from the slits and so that air blown from the blowing outlet did not affect the flight of ink droplets.

As shown in FIG. 6A, as circled in a white circle, for example, in the conventional printhead that does not include an air blowing outlet, ink attached to the leading end of the upper deflection electrode and solids accumulated. As described above, when solids are left to accumulate, the tips of solids come into contact with other constituent members or the cover body and cause malfunctions or incidents.

Conversely, as shown in FIG. 6B, in the print head 10 according to the present invention in which the cap 112 is provided with the air blowing outlet 115, hardly any solids accumulated on the surface of the upper deflection electrode 15. Accordingly, malfunctions and incidents accompanying the accumulation of ink solids can be prevented.

Embodiment 2

Figure 7:
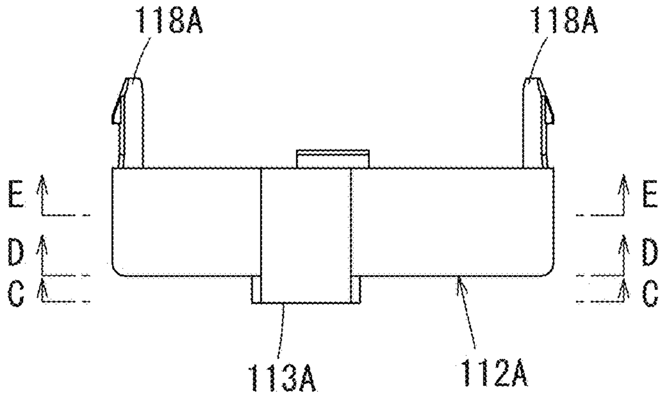
FIG. 7 is a plan view of a cap according to Embodiment 2 of the present invention.
Figure 8A:
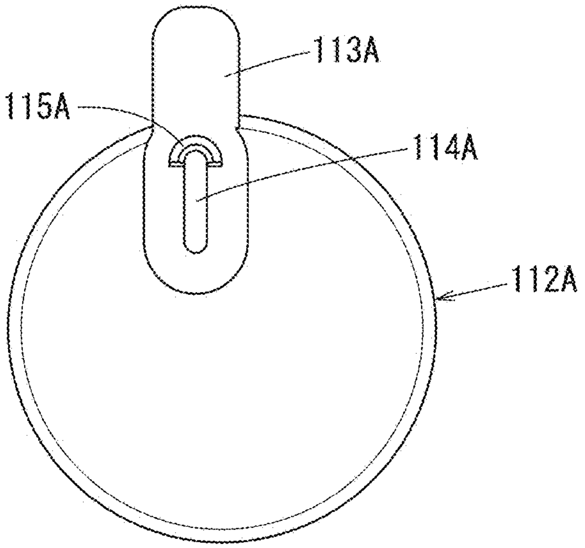
FIG. 8A is front view of the cap.
Figure 8B:
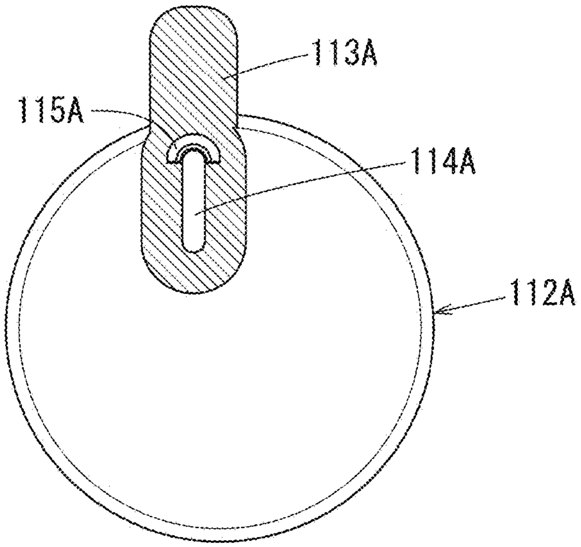
FIG. 8B is cross-sectional view of the cap.
Figure 8C:
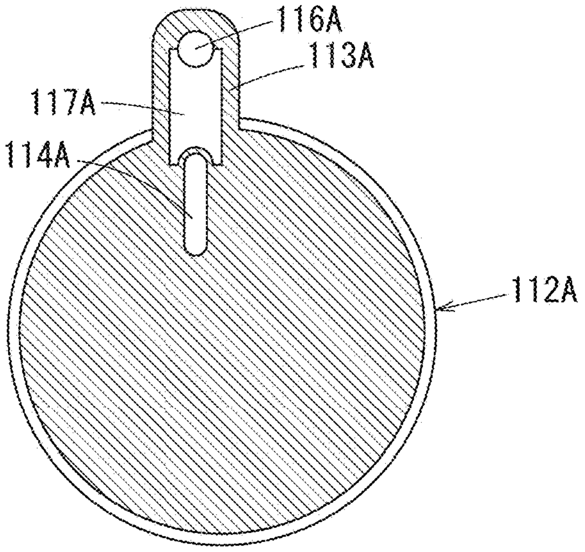
FIG. 8C is cross-sectional view of the cap.
Figure 8D:
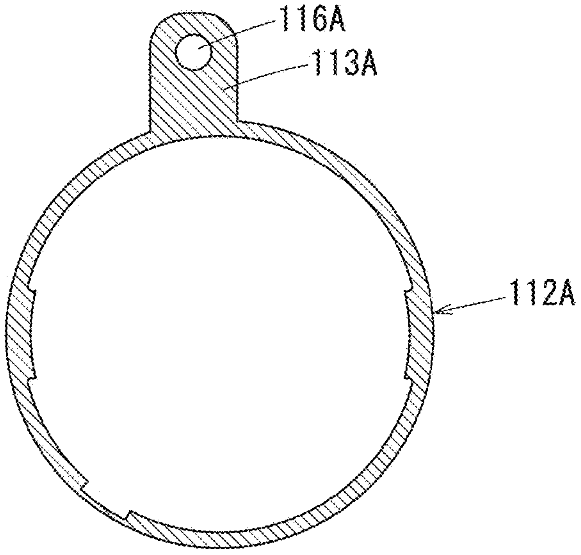
FIG. 8D is cross-sectional view of the cap.

FIGS. 7 and 8 show other examples of caps of a head cover. FIG. 7 is a plan view of a cap 112A, FIG. 8A is a front view of the cap 112A, FIG. 8B is a cross-sectional view taken along line C-C in FIG. 7, FIG. 8C is a cross-sectional view taken along line D-D in FIG. 7, and FIG. 8D is a cross-sectional view taken along line E-E in FIG. 7.

In FIGS. 7 and 8, members with the same functions as those of the cap 112 of Embodiment 1 are given the same reference symbol. Also, the letter A is added to each reference symbol so as to distinguish it from the cap 112 of Embodiment 1.

As shown in FIG. 5 described above, in the cap 112 according to Embodiment 1, the channel 117 is formed surrounding the blowing outlet 115 and channels are formed at equal intervals there between to link the blowing outlet 115 and the channel 117 so that air is uniformly blown out of the air blowing outlet 115.

The cap 112 is often produced using injection molding, but if the channel 117 linking the port 116 and the blowing outlet 115 is complex, the manufacturing cost of the mold increases.

Conversely, in the cap 112A according to the present embodiment, as shown in FIG. 8, a semi-circular blowing outlet 115A is formed at the upper portion of a slit 114A, and the blowing port 115A and a port 116A are linked by a rectangular channel 117A. The shape of the channel 117A is simplified, and thus the manufacturing cost of the mold can be kept lower than that of the cap 112 of Embodiment 1.

Air blown by the blowing outlet 115A according the present embodiment onto a printing surface has more bias in comparison to the blowing port 115 of Embodiment 1. However, it was found through experiments that the effect of preventing the attachment of ink using air blown out from the blowing port 115A is almost the same if the port 116A is formed such that air blown out from the blowing outlet 115A moves somewhat toward the center of the cylinder.

Thus, according to the specifications required of the printhead 10, a configuration may be employed in which an arc-shaped blowing outlet 115A and the channel 117A with a simple shape as illustrated in Embodiment 2 are formed instead of the blowing outlet 115 shaped so as to surround the slit 114 and the channel 117 with a complex shape as illustrated in Embodiment 1.

Note that, in the aforementioned embodiments, a cylindrical head cover was used as the head cover of the printhead, and main members were housed in the cavity portion of the head cover, but the head cover is not limited to being cylindrical. A head cover with a quadrangle or hexagonal cross section may be used so as to match the shape and arrangement of the constituent members.

Although a case in which printing is performed on a printing object moving in a horizontal direction is described in the embodiments described above, the movement direction of the printing object is not limited thereto, and even if, for example, the printing object moves in a vertical direction, a function for preventing dirtying of the printhead by ink that has rebounded off a printing surface can be implemented. In this case, ink droplets are deflected in the horizontal direction.

Herein after, preferred examples of the embodiment of the present invention will be collectively described.

Here, the cap is preferably provided with a port to which an air supply tube is connectable, and an air channel that links the port and the blowing outlet.

The cover body is preferably made of metal.

The blowing outlet is preferably formed so as to surround an end of the slit that is closer to an outer circumferential portion of the cap.

Furthermore, air is preferably supplied from an external compressor to the cavity portion of the head cover, and positive pressure is preferably maintained in the cavity portion while the printhead is driven.

Although the present invention has been fully described by way of example with reference to the accompanied drawings, it is to be understood that various changes and modifications will be apparent to those skilled in the art.

Therefore, unless otherwise such changes and modification from the scope of the present invention hereinafter defined, they should be construed as being included therein.

What is claimed is:

1. An inkjet printer comprising:

a printhead, comprising:

a gun configured to generate continuous ink droplets by applying a vibration having a constant period to ejected ink;

a charging electrode configured to electrically charge at least some of the generated ink droplets by applying a stepped-wave voltage to the at least some ink droplets in synchronization with a period of the ink droplets;

at least one deflection electrode configured to deflect at least some of the electrically charged ink droplets in at least one of a vertical direction or a horizontal direction in accordance with an amount of the charge on each of the droplets, and cause the ink droplets to land on a printing surface of a printing object; and a tubular head cover that houses the gun, the charging electrode, and the deflection electrode in a cavity portion, and that is provided with a slit through which the electrically charged ink droplets pass, wherein a character is formed using rows of printed dots by causing the ink droplets ejected from the printhead to land on the printing object moving in the horizontal direction or the vertical direction, wherein the head cover comprises a tubular cover body having a rear end portion that is sealed, and a cap that is attached so as to cover a front portion of the cover body, and wherein the cap comprises the slit and a blowing outlet that surrounds at least a portion of the slit, and air is blown out from the blowing outlet toward the printing object.

2. The inkjet printer according to claim 1, wherein the cap comprises a port to which an air supply tube is connectable, and an air channel that links the port and the blowing outlet.

3. The inkjet printer according to claim 1, wherein the tubular cover body is made of metal.

4. The inkjet printer according to claim 1, wherein the blowing outlet is formed so as to surround an end of the slit that is closer to an outer circumferential portion of the cap.

5. The inkjet printer according to claim 1, wherein air is supplied from an external compressor to the cavity portion of the head cover, and positive pressure is maintained in the cavity portion while the printhead is driven.

6. The inkjet printer according to claim 1, the gun further comprising a nozzle from which the ejected ink is ejected and a ultrasonic transducer configured to apply the vibration to the ejected ink, wherein the application of the vibration separated the ink into the ink droplets.

7. The inkjet printer according to claim 1, further comprising:

a power supply configured to apply a pulse voltage to the charging electrode;

a controller interfaced to the power supply and configured to control a timing of the application of the pulse voltage to the charging electrode.

8. The inkjet printer according to claim 7, further comprising:

a detection electrode interfaced to the controller and configured to generate a signal, wherein the controller controls the power supply based on the signal.

9. The inkjet printer according to claim 8, wherein the signal is associated with a number of ink droplet already charged by the charging electrode.

10. The inkjet printer according to claim 1, further comprising:

a power supply configured to apply a voltage to the at least one deflection electrode, wherein the at least one deflection electrode deflects one or more of the ink droplets when the voltage is applied to the at least one deflection electrode; and a controller configured to control the application and magnitude of the voltage by the power supply to the at least one deflection electrode based on the desired landing positions on the printing objects of one or more of the ink droplets.

11. The inkjet printer according to claim 1, further comprising:

a tank in which the ink is stored;

a pump configured to pump the ink from the tank into the gun under a pressure, wherein the ink is injected from a nozzle of the gun due to the pressure; and a controller in control of the pump.

12. The inkjet printer according to claim 1, further comprising:

a gutter into which those of the ink droplets that are not charged by the charge electrode and those of the ink droplets that are deflected at the printing objects land; and one or more pipes connecting the gutter to the tank; and a further pump configured to pump the ink droplets from the gutter into the pipes through the one or more pipes.

* * * * *